Sept. 29, 1936.  W. C. EDWARDS, JR., ET AL  2,055,894
FLOATING ENGINE MOUNTING
Filed June 4, 1932  3 Sheets-Sheet 1
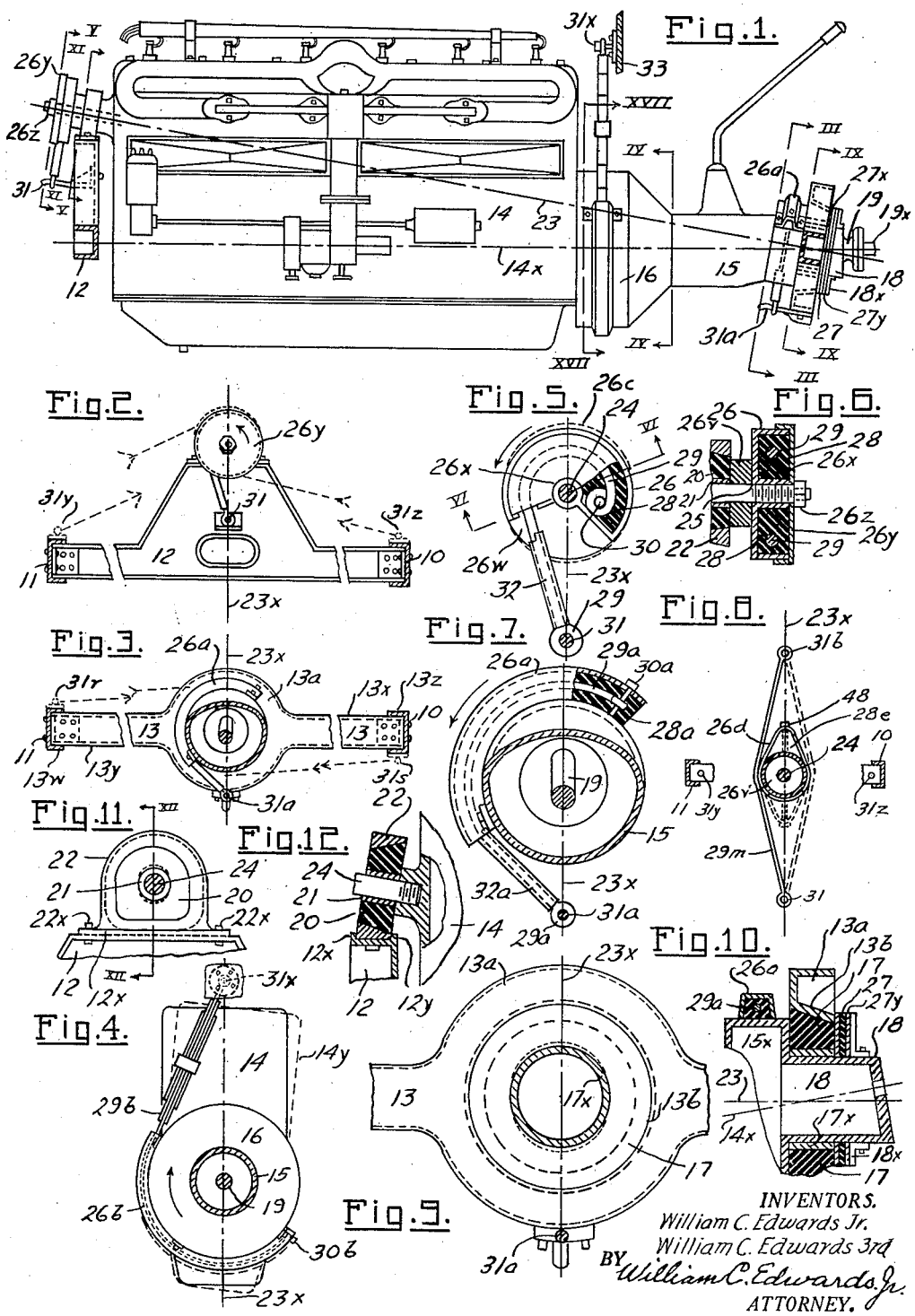
INVENTORS.
William C. Edwards Jr.
William C. Edwards 3rd
BY William C. Edwards Jr.
ATTORNEY.

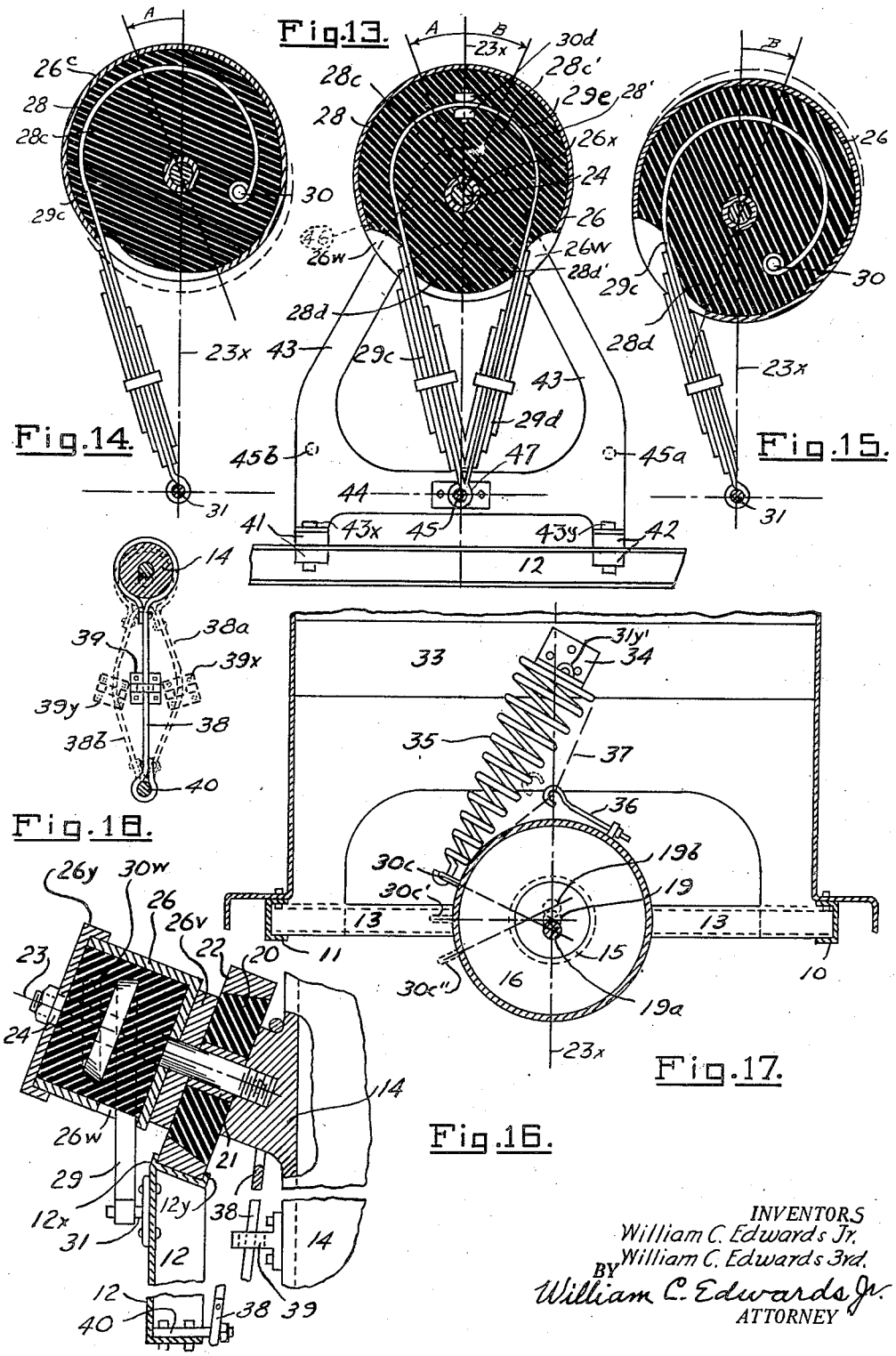

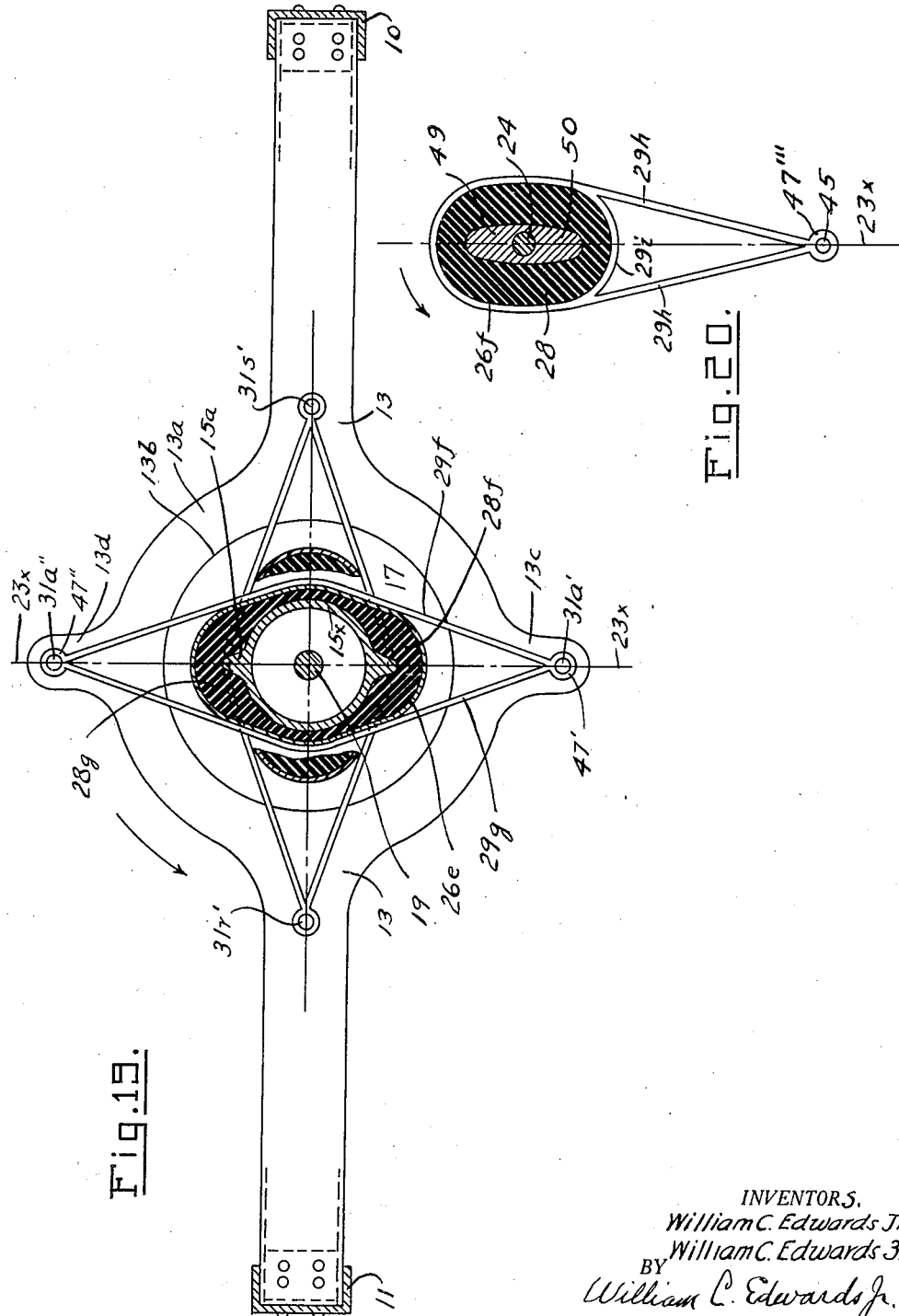

Patented Sept. 29, 1936

2,055,894

UNITED STATES PATENT OFFICE 2,055,894

FLOATING ENGINE MOUNTING

William C. Edwards, Jr., and William C. Edwards, 3rd, Kansas City, Mo., assignors to Chrysler Corporation, Highland Park, Mich., a corporation of Delaware Application June 4, 1932, Serial No. 615,334

13 Claims. (Cl. 248—7)

Our invention relates to a two point engine mounting particularly applicable in mounting an internal combustion engine in an automobile frame. Rotation of the engine crank shaft causes periodic vibration in the automobile frame if the engine is mounted conventionally at three or four points.

The objects of our invention include; First, to suspend the engine in perfect balance at two points in bearings arranged in axial alignment with the true axis of oscillation. Second, that the axis of the crank shaft of the engine intersects the axis of oscillation in a bearing. Third, that the axis of oscillation is resiliently stabilized in the central vertical plane of the frame. Fourth, that the axis of oscillation can raise and lower in the central vertical plane of the frame. Fifth, that the axis of oscillation can raise and lower in the central vertical plane of the frame in parallelism to its initial position. Sixth, to suspend the engine in perfect balance at two points in metallic bearings centrally arranged within resilient mountings supported in metallic elements on cross frame elements of a rigid frame. Seventh, to suspend the engine in perfect balance at two points in metallic bearings centrally arranged within resilient mountings supported within metallic elements on a cross frame element of a rigid frame, and each mounting being bisected by a plane at right angles to the axis of oscillation. Eighth, the absorption of end thrust reactions of an internal combustion engine suspended for oscillation at two points on a frame structure. Ninth, a metallic bearing for receiving a supporting element of an internal combustion engine subject to oscillatory movements, and a conical shaped resilient element enveloping the bearing and a cone shaped metallic frame element as a seat for the resilient element. Tenth, windlass-like stabilizing means in combination with the engine and frame for resiliently absorbing oscillatory movements of the engine in either direction. Eleventh, means for absorbing shocks, jars, and strains, and for promoting better engine operation, in automobiles, airplanes, stationary engines etc.

These and other objects will be more fully developed in the description of the arrangement, combination and construction of the invention as disclosed in the drawings. In the drawings, Fig. 1 shows the left side elevation of an internal combustion engine mounted in accordance with the principles of our invention. Fig. 2 shows a front elevation of the forward cross-member of an automobile frame with our forward stabilizing assembly arranged thereon. Fig. 3 represents a sectional view, taken along the line III—III in Fig. 1, and looking in the direction of the arrows. Fig. 4 represents a sectional view taken along the line IV—IV in Fig. 1 and looking in the direction of the arrows. Fig. 5 represents a view taken along the line V—V in Fig. 1, partly in section, disclosing elements in combination for forward stabilization. Fig. 6 represents a sectional view taken along the line VI—VI in Fig. 5. Fig. 7 shows an enlarged view, partly in section, of the stabilizing means seen in Fig. 3. Fig. 8 is an alternate arrangement of stabilizing means to that seen in Fig. 2, showing compressive cam means within a flexible cage element. Fig. 9 represents a forward view of the rear cross-frame member, taken along the line IX—IX in Fig. 1, and looking in the direction of the arrows showing the conical resilient element seated in its metallic seat, and the metallic bearing centrally arranged within the resilient element ready to support and receive for oscillatory movements the right hand axle element of the engine assembly. Fig. 10 represents a fragmentary sectional view, taken along the vertical plane through the axis of oscillation of the engine as seen in Fig. 3. Fig. 11 represents a forward elevation of the forward bearing assembly and associated parts as viewed along the line XI—XI in Fig. 1, and looking in the direction of the arrows. Fig. 12 shows a cross-sectional view taken along the line XII—XII in Fig. 11. Fig. 13 is a representation of a compound double acting modification of stabilizing mechanism seen in Figs. 2 and 5, showing the flexible element 29c eccentrically embedded within the resilient element 28 to form upper portions 28c, and inner portions 28d useful in accelerating the actions of the stabilizing means under torque reactions in limiting oscillatory movements of the engine in either direction. As illustrated, the engine is not firing. Fig. 14 shows the ultimate position of a modified windlass-like stabilizer similar to Fig. 5 at the maximum degree of oscillation occasioned by a torque created impulse acting in the direction of the arrow A in Fig. 13. During this movement, the portion 28c tends to accelerate unwinding of the flexible element and compress the outer resilient portion 28 against the flanged cage. This movement also tends to roll the axis of oscillation upwardly along the plane 23x away from the anchorage of the flexible element to the frame. Fig. 15 shows the ultimate position of the windlass-like stabilizing means seen in Fig. 14 at the maximum degree of oscillation occasioned by a torque created impulse acting in the direction of the arrow B, in Fig. 13. This movement tends to wind the flexible element on and compress the inner resilient portion. This movement also tends to roll the axis of oscillation downwardly along the plane 23x towards the anchorage of the flexible element to the frame. Fig. 16 shows an alternate construction to Figs. 5, 12, and 13. A pair of flexible elements are illustrated, one being anchored at 30w to the cage of the stabilizer, and wound and embedded circuitously in a conical manner within the resilient element in the cage and leading in a vertical plane to an anchorage with the cross frame; the other vertically linking the engine to the cross member but subject to intermediate sidewise flexure, in either direction, occasioned by contact with an engine element subject to torque created movements. Fig. 17 shows a view, taken along the line XVII—XVII, Fig. 1, through the side frame members and looking in the direction of the arrows to show an alternate construction for stabilization. A helical spring, in anchored combination with the flywheel casing and a cross-frame member above the axis of oscillation, tends to maintain said axis in the vertical plane intermediate the side frame members during torque created oscillatory movements of the engine in either direction. Fig. 18 represents a forward diagram of the flexible link seen in Fig. 16. Figs. 19 and 20 show modifications of the elements seen in Figs. 8 and 13. Similar numerals of reference indicate corresponding parts throughout all the figures of the drawings.

Referring to the drawings; at 10 and 11 are shown the conventional side channel members of a rigid frame connected at the front and rear by the weight supporting cross-frame members 12 and 13, and between which is mounted an internal combustion engine 14 having a transmission case 15 rigid to the flywheel casing 16 and at the rear thereof. The conventional mounting of the engine at three or four points upon an automobile frame produces torque created vibratory movements in the frame, spring supported from the axle. Attempts have been made to eliminate this vibratory movement by suspending the engine at two engine mountings and thus permitting engine oscillation; then through stabilizing means associated with the engine and with the frame resiliently absorbing the oscillatory movements. Several factors were disregarded and hence these prior attempts have not proven entirely successful. One factor requisite to proper stabilization includes the oscillation of the engine mounted at two points on the true axis of oscillation in a vertical plane centrally positioned intermediate the side frame members; where oscillation is permitted on two mountings arranged on supports offset wth respect to the true axis, oscillation would not occur upon the true axis but instead would occur upon an actual axis of oscillation and in some instances lying in a different plane. Another factor relates to the pivotal connection of the automobile frame with the axle of the automobile; forces applied to the frame at a distance from the axis of pivotal movement of the frame on the axle tend to overturn the frame; where resilient means, directly or indirectly, are associated with the engine and the side frame members in such a manner as to create these overturning influences under torque impulses, vibration in the frame will surely occur. Another factor relates to endwise flotation of the engine. Another factor found in non-metallic resilient mountings is the tendency for greater movements in expansion of the mountings than in compression thereof. Another factor in non-metallic resilient mountings is the tendency of the axis of oscillation to roll away from the central vertical plane of the frame and towards the right frame member, in this application oppositely acting forces are applied on opposite sides of the true vertical plane or so that these forces acting on short lever arms around an axis in the true vertical plane create opposite vertical movements in the side frame members with a resultant vibratory movement in the frame. These factors then tended under certain conditions to occasion periodic vibrations that should have been eliminated. These vibrations are particularly noticeable in starting the engine, at times when the engine is running slowly and when quick acceleration of the engine occurs.

We have found by floating the engine in balance for stabilized oscillation at two points, and by maintaining these points resiliently in the central vertical plane of the frame structure by proper stabilizing means, that oppositely acting forces will not occur in the side members 10 and 11, as in prior art, and therefore we are able to eliminate this class of vibratory movements of the frame.

The cross frame member 13, seen in Figs. 1, 3 and 19, is arranged at the rear of the engine assembly and may be of any desired construction for the best interests of the combination. For purposes of illustration, the member 13 embodies a channel shaped element having flanges 13x and 13y and is riveted at 13z and 13w to the side members 10 and 11, respectively. In this application, the member 13 is enlarged as at 13a and provided with a central conical shaped bore 13b serving as a seat for the cone-like face of a resilient ring-like pad 17 surrounding a metallic bearing 17x receiving the rear end part 18 of the engine assembly for oscillatory movements of the trunnion 18 in said bearing. The pad 17 is of such quality of rubber or other composition that after compression, it will always return to its original shape regardless of distortion. It will be understood that the usual gears may be arranged on the transmission shaft 19, but are omitted in the drawings as unnecessary to the disclosure. The case 15 is properly cast or formed towards the rear end to accommodate the stabilizing installation and the matter of oscillatory movements of the engine in the bearing 17x. The shaft 19 leads to a universal joint through an opening in the end of the case 18 for driving the shaft leading as at 19x to the rear axle installations of the automobile, as will be readily understood. Roller or ball bearings 17x may be used.

Arranged upon and intermediate the ends of the forward cross frame member 12 is shown a metallic housing 22, preferably of conical interior as shown by the cross-sectional view Fig. 16. This serves as a seat for the cone-like face of a ring-like resilient pad 20 surrounding a metallic bearing 21. The housing 22 is bolted at 22x to the upper face of the member 12 between flanges 12x and 12y thereof. Rigid to and forwardly extending from the motor 14 is seen the supporting trunnion 24 arranged within the bearing 21 for oscillatory movements in said bearing. The true axis of oscillation 23 of the engine as seen in Fig. 1 is always the axis of the elements 24 and 18 and their respective bearings. The rear bearing 17x is positioned lower than the forward bearing 21 to properly balance the engine 14 on the axis 23, and is established with special reference to the necessity of maintaining the shaft 19 in a proper relationship to the shaft 19x. As seen in Figs. 1 and 10, the axis 14x of the crank shaft intersects the axis of oscillation 23 in the bearing 17x. The rear assemblage 17x—17—13a and the front assemblage 21—20—22 are each bisected by planes at right angles to the axis of oscillation 23, around which as previously stated the engine is balanced; the trunnion elements 24 and 18 therefore always allow engine oscillations in the true axis 23 through the bearings 21 and 17x under irregular torque impulses.

Thus the first essential for proper engine flotation is accomplished, namely, oscillation in the true axis.

The second essential, proper resilient support, is provided by 41—42 or the pads 20 and 17 entirely enveloped by the frame elements 22 and 13a.

The third essential is resistance to endwise movements. Referring to Figs. 1, 6 and 16, the hub 26x of the flanged cage 26 is rigid at 25 to the element 24 and at 26v is a spacer; therefore end thrust of the engine towards the right of Fig. 1 is resiliently absorbed, the spacer 26v driven by the cage 26 contacts the pad 20 as in Fig. 6; and, the case 15 enlarged at 15x Fig. 10 compresses the cone-like face of the pad 17 against the bore 13b as will be readily understood. Similarly, end thrust of the engine towards the left of Fig. 1 is also resiliently absorbed; the engine 14 compresses the cone-like pad 20 against the housing 22 as in Fig. 12 while encircling the end 18 will be seen a resilient ring 27 intermediate metallic rings 27x and 27y; the ring 27x contacts the metallic bore 13b and bearing 17x and the brackets 18x rigid to the member 18 serve in this instance to compress the resilient ring as will be readily understood.

The sole remaining essential, namely, resilient absorption of irregular torque impulses requires stabilizing means tending to hold the axis of oscillation 23 in the central vertical plane 23x, and without creating vertical forces tending to overturn the frame on the axle of the automobile. No engine is free of torque created vibratory movements. More cylinders tend to make the engine operate smoother but more cylinders can never eliminate all torque created movements. In prior art, the idea has been to absorb these vibratory movements through resilient means acting in combination with levers, etc., and applied to the frame away from the axis of oscillation of the frame on the axle. It is true that slight vibrations may be absorbed in this way without objection; but the larger the impulse the greater is the tendency of the member 11 to depress around the axis of the frame of the automobile upon the axle thereof. It will be found in our treatment of this problem, and in recognition of this fact, we concentrate our efforts at stabilization in the plane 23x with a preconceived recognition of the relationship of the axis of oscillation 23 to the pivotal axis of the frame upon the axle of the automobile; by so doing we entirely eliminate torque created vibratory movements of the members 10 and 11 in opposite directions.

Within the flanged cage 26 we concentrate a resilient element such as rubber 28, and embedded therein is seen arranged a flexible element 29 secured by a pin 30 to said cage and leading in a counterclockwise manner out through the space 26w of the cage assembly. At 26y is shown a cap covering the front of the cage 26, being secured against the end of the element 24 by means of the nut 26z. Forwardly projecting from the cross frame member 12, and in the plane 23x, is the bracket 31; and the free end of the flexible element 29 after passing through stiffening means, such as the tube 32, is then rigidly secured at its outer end to the bracket 31 as seen in Figs. 5 and 14.

Similarly at the rear end of the Fig. 1 is arranged another cage 26a applied around the enlarged case portion 15x. Within the cage 26a is concentrated a resilient element 28a; and embedded therein is a flexible element 29a, secured by a pin 30a to the assemblage; and leading in a counterclockwise manner from the cage 26a, and passing through the sleeve 32a for attachment to the bracket 31a, rigid to the element 13a in the plane 23x.

A somewhat similar installation is disclosed in Figs. 1 and 4. Here a flexible spring-like element 29b is attached at 31x to a bracket on an upper cross frame member 33, such for instance as the dashboard of the automobile, and leads into and around a cage 26b on the periphery of the case 16, for illustration; it being understood that this assembly may be positioned at any place along the engine for the best results. The end of the element 29b is attached to a pin 30b. The spring 29b is preferably embedded in rubber arranged within the cage 26b as in the previously described installations.

The function of the means seen in Figs. 5, 7 and 14 are identical; under a torque created impulse, the engine tends to lean towards the right, as seen at 14y, Fig. 4. This movement tends to force the member 29 to unwind in the direction of the counterclockwise arrow in Fig. 5. This movement being resisted at 31, and the sleeve 32 preventing a buckle in the flexible element 29, the tendency of the element 29 to compress results in compression of the rubber 28 intermediate the member 29 and the top flange of the cage 26; this tendency for the rubber to compress creates a tendency for the cage 26 to rise to the dotted position 26c; this vertical movement tends to cause the shaft 24 to raise the bearing 21 to the upper dotted position illustrated in Fig. 11, thereby throwing the upper part of the pad 20 into compression. It will be noted that during this operation, the bearing 17x Fig. 9 also tends to rise to the upper dotted position and compress the pad 17, the compression in each case being greatest in the plane 23x. The axis of oscillation 23 thereby assumes momentarily a position in parallelism to its original position, but ready to return to its original position. The sides of the pads furnish an equal resilient side thrust, and therefore the tendency is for the axis of oscillation 23 to remain equidistant from the side members 10 and 11. The effect of torque impulse in the above case is merely to lift the engine, that is, to diminish the weight of the engine upon the pads 20 and 17 in the plane 23x below the bearings; thus the tendency of torque impulses to create vibratory movements in the frame, as in prior art, is now entirely absorbed between the points 24 and 31, and 18 and 31a. A reversal of torque impulse, such for instance as a backfire of the engine, would create clockwise movements of the elements 29 and 29a around the axis 23 serving to depress the bearings 21 and 17x to the lower dotted position seen in Figs. 11 and 9, or as illustrated in Fig. 15. The inner portion 28d accelerates this movement.

In Fig. 13, resilient pads 41 and 42 are arranged upon the member 12, on either side of the plane 23x. A metallic standard 43 is resiliently supported on the pads and secured by bolts 43y and 43y to the member 12. A bearing 46, arranged at the top of the member 43, is bisected by the plane 23x, and supports the axle 24. Fixed within the cage 26 is a resilient element 28. Embedded circuitously in the element 28 is the central flexible portion 29e of our compound double acting assemblage, and anchored to the element 30d, rigid to the engine. This assemblage differs from that in Fig. 4 by having two oppositely extending stiffened end portions converging and joining at a common end 47, and as illustrated is symmetrically arranged around a pair of upper eccentric portions 28c and 28c' and a pair of lower eccentric portions 28d and 28d'. The assemblage seen in Fig. 14 may be considered representative of the left hand portion of Fig. 13, while the right hand portion of Fig. 13 would therefore be a reversed application of the unit seen in Fig. 14. While not limiting ourselves to the character of the standard disclosed, the illustration shows our principles of stabilization effectually eliminating torque created vibratory movements in the automobile frame. The reasons why the axis of engine oscillation should lie in the plane 23x have been discussed; the reason why it stays there under torque created impulses is because our principles of stabilization maintain it there. As illustrated the end 47 is anchored in the plane 23x to the bracket 45 on the part 44 of the standard. Oscillatory movement through the arc A would create opposing forces; one tending to elevate the trunnion 24 as in Fig. 14, the other tending to lower the trunnion through action of the part 29d applied as in but reversed to that shown in Fig. 15. Arc movement B would cause part 29e and eccentric 28c' to oppose the action of the part 29c and eccentric 28d. Thus equalization of forces in either arc movement stabilizes resiliently the axis 23 in the bearing 46. All stress is absorbed between the parts 46 and 45. We may anchor the part 47 at either 45b or 45a and accomplish the same result. We could also connect the end 47 at 31y, 31 or 31z, Fig. 2. If the cage 26 were substituted for 26a, Fig. 3, the end 47 could attach at either 31r, 31a or 31z; or, if substituted for 26b, Fig. 4, the end 47 could connect at 31x or to either side member, this would also support the center of the engine against road shocks. The effect in any application would tend to resiliently hold the axis 23 in the plane 23x. Torque will not affect the rubber pads 41—42, Fig. 13, if our compound double acting installation is employed. If however the part 47 were anchored at 31, 31a or 31x, the resilient stabilizer would assist any pads in resisting vertical movements of the engine due to road shocks. The assemblage Fig. 13 may be used as a replacement unit for obsolete mountings of previously constructed automobiles.

In Fig. 8 a flange 26d forms a flexible band around a metallic unit 26v' rigid on the engine 14; the band 26d envelops a resilient eccentric 28e. A pin 48 may connect the band 26d to the element 26v'. An element 29m taut against the band 26d has two end portions somewhat similar to 29c and 29d, Fig. 13; one end engages the bracket 31, Fig. 2 while the opposite end engages a duplicate bracket 31b rigid to the frame above the bracket 31 in the plane 23x. A duplicate installation is indicated by the dotted lines. Another composite set may attach to the points 31y, 31z, Fig. 2. The eccentric acts upon the member 29m similar to that disclosed in Fig. 19.

In Fig. 19 enveloping the case 15x is seen a resilient double eccentric 28f—28g. Abutment lugs 15a on the case 15x support the cam device. Around the eccentrics is a flexible band 26e. Upper and lower bosses 13d, 13c have brackets 31a'' and 31a', respectively. Connecting at 47' and 47'' to the brackets 31a' and 31a'' is shown a metallic element having two side parts 29f—29g taut against the band 26e. A duplicate installation connects at 31r' and 31s' on the member 13 or to the side members at 31r and 31s. Under a torque movement in the direction of the arrow, the eccentric elements driven by the parts 15a tend to spread the parts 29f—29g; the eccentrics thus compressed create a force acting entirely between the points 31a'' and 31a', tending to draw said parts together; similarly the parts 31r' and 31s' tend to draw together. Thus lateral arc movements are entirely absorbed in the frame 13 and serve to stabilize the axis 23 in the plane 23x. No forces therefore exist to cause opposite vertical movements of the members 10 and 11 and frame vibrations caused by torque are eliminated.

In Fig. 20 we show a rigid metallic unit 29h having a forked end 47''' anchored as at 45, Fig. 13. An intermediate part 29i is integral with the side elements 29h forming a cage 26f within which is embedded a resilient element 28. Upon the shaft 24, Fig. 12 is rigidly secured a metallic double eccentric 49—50. Torque movement in the direction of the arrow tends to rotate the eccentrics and compress the rubber 28 against the sidewalls of the cage 26f and build up a counter force tending to stabilize the axis of oscillation of the engine, in the vertical plane 23x. If desired we may employ a boss such as 13d, Fig. 19 in combination with the upper part of the standard 43, Fig. 13 and attach the upper part of the member 29h thereto by means of a connection such as 47''—31a'', Fig. 19.

The cage 26b of the stabilizing assembly seen in Fig. 4 is not centered in a plane at right angles to the axis 23, that would be the more correct application. The illustration, therefore, furnishes an alternate construction. Being engaged at 31x above the axis 23, the tendency to unwind in the direction of the arrow Fig. 4, under a torque created impulse, produces an opposite force to that produced under the same movement of the engine by the elements seen in Figs. 5 and 7 connected at 31 and 31a below the axis 23. In Fig. 4, the axis tends to roll down the plane 23x under a torque created impulse; it would roll up the plane 23x if the engine backfired. Thus under such torque created impulse, the engine leaning towards the right at 14y would at the same time tend to lower and depress the bearings 21 and 17x to the lower dotted positions shown in Figs. 11 and 9. This as stated above is the direct opposite effect to the movements produced by the forward and rearward stabilizers—they tended to raise the engine. The device seen in Fig. 4 may be omitted and one or both of the end stabilizers employed. Under some considerations still another plan of stabilization might be employed; for instance, in Fig. 2 assume the end of the element 29 attached to the member 11 at 31y. Since the force created between the axis 23 and the point of support acts to push the axis directly away from the support, the axis 23 would be shifted to the right and out of the plane 23x in the direction of the dotted arrow; as this would be objectionable we would suggest a duplicate installation and connect its element 29 to the frame 10 at 31z. This second set would create a thrust along the dotted directional line tending to shift the axis 23 to the left of the plane 23x. The two forces would therefore be equalized and the axis 23 would tend to remain in the plane 23x, and in which it would rise, thereby repeating what the single application at 31 did in the prior discussion of Fig. 5 and Fig. 11. Similarly if 29a were attached to the member 11 at 31r, a second set would be necessary for an attachment at 31s to the member 10. If desired, three stabilizers connecting at 31y, 31, and 31z, could be employed for a three way application. Similarly a three way stabilization could be effected by attachment at 31r, 31a, and 31s, in Fig. 3; and if the application shown in Fig. 4 were also employed, the effect at both ends would be a four way stabilization; all seeking to retain the axis 23 stabilized in the plane 23x. It is therefore possible to select the best arrangement of parts and secure the best results both in eliminating frame vibration, and also in positioning the shaft 19 for a proper driving relationship with the shaft 19x.

Just as springs are essential in suspending the automobile body for easy riding qualities, the engine should be free to move resiliently without transmitting vibratory shocks to the body of the automobile.

Under our design, the bearings 21 and 17x could be eliminated with fairly satisfactory results; but as the trunnion 24 and the trunnion 18 would grip the pads 20 and 17, instead of being free to oscillate as in the bearings thus discarded, a twisting in the rubber of the pads would in a measure transmit some overturning tendency to the members 10 and 11, hence would not give the maximum efficiency.

Referring to Fig. 17; in the upper cross frame member 33 and in the plane 23x is centered a bracket, such as indicated at 34. This bracket serves as a seat for the base of a helical spring 35, anchored to the bracket at 31y' and to the casing 16 at 30c. In this alternate arrangement, the action of the spring tends to create vertical movements of the axis of oscillation in the same direction as described in Figs. 5, 7 and 14, or directly opposite to that produced by the device seen in Fig. 4. From its normal position, the shaft 19 has rolled down the plane 23x to 19a. This was due to a torque reaction, caused by backfiring of the engine, causing compression of the spring 35 through the arc 30c'—30c. If desired, we may employ a tie 36 rigid to the casing 16, as disclosed; if this tie is linked to the spring 35, the resistance against the torque reaction would be accelerated since the spring would be pulled to the position indicated by the dotted line 37, during the arc movement from 30c' towards 30c. A torque impulse in the direction of the arrow Fig. 5 would bend and elongate the spring 35 around the arc 30c'—30c'' and roll the shaft 19 up the plane 23x to 19b. If desired, we may eliminate stabilizing means at the ends of the engine and use the devices seen in Figs. 4 and 17, in combination. Eccentric means in function like those indicated at 28c and 28d are also applicable in combination with the assembly seen in Fig. 7. It is also obvious that we may reverse the positions of our stabilizers Figs. 5, 7, 14 upon their respective supports and thereby reverse the specified vertical movements of the axis of oscillation 23 in the vertical plane 23x, during torque created movements.

Referring to Figs. 16 and 18; a flexible element 38 is secured around the engine part 14 and suspended and threaded through a vertical passage in the bracket 39 forward extending from the front end of the engine and situated in the plane 23x when the engine is not running, the free end of the element 38 is then anchored in a taut position to a bracket extension 40 rigid to the cross member 12 and also in the plane 23x. During a torque created impulse tending to oscillate the engine to the position 14y Fig. 4, the bracket would shift through an arc to the position indicated at 39x, this would pull the element 38 out of the vertical plane to the position 38a against the tendency of the axis 23 to roll away from the plane 23x in the other direction, by this pull at 39x, the engine axis of oscillation tends to remain in the plane 23x but is drawn slightly towards the anchorage 40 where the force is absorbed by an upward pull on the member 12. If the bracket 39 is oscillated in the opposite direction to 39y and the tie 38 is accordingly bowed as at 38b, the effect would be the same. The action of the above installation is therefore tending to compress the pad 20, Fig. 11 in the plane 23x against the base of the housing 22. The strap under torque created movement as in Fig. 5 and Fig. 14 would tend to compress the upper side of the pad 20 against the upper part of the housing 22. This tends to hold the axis 23 in a stabilized position in the plane 23x, best serving the interests of the invention.

Such modifications may be employed as lie within the scope of the appended claims. Having fully described our invention what we now claim as new and desire to secure by Letters Patent is:

1. In a stabilizing assemblage of the class described; a cage engaged to an internal combustion engine and having resilient means including eccentric portions within the cage, flexible means circuitously embedded and arranged within the resilient means adjacent said eccentrics and outwardly leading from the cage and terminating in an anchorage element.

2. In combination, an internal combustion engine having a crank shaft and a pair of trunnion elements, one for each end of the engine and oppositely extending therefrom in a selected axis of oscillation, said engine producing irregular torque impulses; a frame including forward and rearward cross frame weight supporting means and a pair of side elements connecting to said means; forward and rearward engine mountings receiving said trunnions and permitting desired engine oscillation therein, said mountings being bisected by a vertical plane intermediate said side frame elements and secured high and low upon said weight supporting means; and a device including anchorage means on the frame and resilient means on the frame fixed to the engine and subject to oscillation around said axis and means connecting said resilient means and anchorage, all coacting during torque created oscillatory movements of the engine for producing forces tending to stabilize the axis of oscillation vertically, in a vertical plane.

3. In combination, an internal combustion engine having a crank shaft and trunnion elements, said engine producing irregular torque impulses; a frame including forward and rearward cross frame weight supporting members and a pair of side frame members connecting said cross frame members; forward and rearward engine mountings permitting engine oscillation, said mountings being bisected by a vertical plane intermediate the side frame members; each mounting including a conical seat in its cross frame support, a resilient cone faced pad seated therein and a metallic bearing, in the axis of engine oscillation, secured within and enveloped by the pad and receiving and supporting for oscillation a trunnion of the engine.

4. Means for resiliently stabilizing the axis of oscillation of an internal combustion engine having trunnions suspended for oscillation in two mountings carried by a pair of supporting elements; anchorage means on a support, a device enclosing resilient means fixed to the engine and subject to oscillation around said axis, and means connecting to said anchorage means and coacting with said device during torque created oscillatory movement of the engine for producing forces tending to resiliently stabilize the axis vertically in a vertical plane.

5. Means for absorbing oscillatory movements of an internal combustion engine resiliently supported for oscillation at two points upon weight supporting means of a rigid frame structure, as produced by irregular torque impulses of said engine; comprising, windlass-like stabilizing means associated with the engine and anchored to the frame and whereby said oscillatory movements tend to roll the axis of oscillation up and down a vertical plane through successive positionings in parallelism to its initial position without producing vibratory movements in the frame structure.

6. In a two point engine mounting of the class described; an engine producing irregular torque impulses; side frame members and rearward and forward cross frame weight supporting members connecting the side members; said engine having trunnion elements supported for engine oscillation in bearings at the front and rear of the engine upon said weight supporting members; and double acting windlass-like means anchored to the engine and to the frame and means associated therewith tending to unwind resiliently and move the axis of oscillation away from the anchorage at the frame, and tending to wind and move the axis of oscillation towards the frame anchorage under torque reactions in opposite directions, respectively.

7. In a two point engine mounting of the class described; an engine producing irregular torque impulses; side frame members and rearward and forward cross frame weight supporting members connecting the side members; said engine having trunnion elements supported for engine oscillation in bearings at the front and rear upon said weight supporting members; and double acting windlass-like means and a double eccentric associated therewith in a resilient combination, said means being anchored to the frame and associated with the engine around the axis of oscillation thereof, said means tending to unwind during torque reactions in one direction and move the axis of oscillation away from the anchorage at the frame, and during torque reactions in the opposite direction tending to wind and move the axis of oscillation towards the anchorage at the frame.

8. In an engine mounting of the class described, a standard having a base portion and an outer portion including a metallic bearing; a trunnion of an engine arranged in said bearing and another bearing in another support receiving an opposite trunnion element, said bearings permitting engine oscillation occasioned by irregular torque impulses; and a device rigid to the engine and enclosing a resilient element including paired sets of double eccentric elements; flexible means centrally and circuitously secured to said resilient means and arranged around the axis of oscillation as a yoke having a pair of converging portions outwardly extending from the device to an anchorage on the standard.

9. In a device as described in claim 8, characterized by the further fact that engine oscillation in either direction causes an eccentric of one set and an opposite eccentric on the other set to function in combination with the yoke element and resiliently stabilize the axis of oscillation in a vertical plane and dissipate the torque created force in the standard intermediate the axis of engine oscillation and said anchorage.

10. Means for resiliently stabilizing the axis of oscillation of an internal combustion engine for vertical movement in a vertical plane including a pair of weight supporting elements, spaced apart, each having a trunnion bearing; said engine having trunnion extensions at its opposite ends arranged in said bearings and subject to torque created oscillatory movements therein; and a device rigid to a trunnion including resilient means and flexible means circuitously arranged within the resilient means and terminating in a bifurcated element connecting to a weight supporting element beneath the trunnion.

11. Means for resiliently stabilizing the axis of oscillation of an internal combustion engine having trunnion extensions suspended for oscillation in paired mountings, spaced apart, in weight supporting means; anchorage means on a support, a device rigid to the engine subject to oscillation around said axis and resilient means and a flexible element in combination therewith connecting to said anchorage and circuitously arranged around and beyond said axis whereby under a torque created oscillatory movement of the engine, an unwinding of the flexible element is resiliently resisted by the device at the axis of oscillation without producing vibratory movements in the support.

12. Means for resiliently absorbing torque created oscillatory movements of an internal combustion engine in either direction, including an engine having trunnions suspended for oscillation in paired mountings, spaced apart, in weight supporting means; and a device arranged and secured to a trunnion around its axis of oscillation, said device including resilient means and an element circuitously embedded and arranged in the resilient means and connecting to the supporting means beneath said trunnion.

13. An internal combustion engine having forward and rearward trunnions and a frame having high and low trunnion bearings receiving and supporting the said trunnions, and means constructed and arranged to resiliently eliminate orbital movement of the trunnions and limit movement of the trunnions to vertical movement in a plane bisecting said bearings.

WILLIAM C. EDWARDS, Jr.
WILLIAM C. EDWARDS, 3rd.